(12) United States Patent
Muccini et al.

(10) Patent No.: US 10,152,106 B2
(45) Date of Patent: *Dec. 11, 2018

(54) POWER EXCURSION TOLERANT POWER SYSTEM

(71) Applicant: Dell Products L.P., Round Rock, TX (US)

(72) Inventors: Mark Muccini, Georgetown, TX (US); Shawn Joel Dube, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/135,240

(22) Filed: Apr. 21, 2016

(65) Prior Publication Data

US 2016/0320820 A1    Nov. 3, 2016

Related U.S. Application Data

(63) Continuation of application No. 13/630,927, filed on Sep. 28, 2012, now Pat. No. 9,342,137.

(51) Int. Cl.
G06F 1/28       (2006.01)
G06F 1/26       (2006.01)
G06F 1/32       (2006.01)

(52) U.S. Cl.
CPC ............... G06F 1/28 (2013.01); G06F 1/263 (2013.01); G06F 1/266 (2013.01); G06F 1/3206 (2013.01); G06F 1/3296 (2013.01); G06F 1/32 (2013.01); G06F 1/3231 (2013.01); G06F 1/3293 (2013.01); Y02D 10/172 (2018.01); Y02D 50/20 (2018.01)

(58) Field of Classification Search
CPC . G06F 1/263; G06F 1/266; G06F 1/28; G06F 1/32; G06F 1/3206; G06F 1/3231; G06F 1/3293; G06F 1/3296; Y02D 50/20; Y02D 10/172

See application file for complete search history.

(56) References Cited

U.S. PATENT DOCUMENTS

| | | |
|---|---|---|
| 5,621,630 A | 4/1997 | Suzuki et al. |
| 5,969,513 A | 10/1999 | Clark |
| 6,150,802 A | 11/2000 | Andrews |
| 6,169,680 B1 | 1/2001 | Matsui et al. |
| 2003/0105983 A1 | 6/2003 | Brakmo et al. |
| 2004/0232899 A1 | 11/2004 | Herbert |
| 2006/0047986 A1 | 3/2006 | Kurts et al. |

(Continued)

*Primary Examiner* — Terrell S Johnson
(74) *Attorney, Agent, or Firm* — Haynes and Boone, LLP

(57) ABSTRACT

A power excursion tolerant power system includes at least one powered component. A system capacitance and at least one power supply are coupled to the at least one powered component. The at least one power supply is operable as a voltage controlled current source to supply power to the at least one powered component when a system load is below a predetermined threshold. The at least one power supply is operable as a constant current source, and together with the system capacitance, to supply power to the at least one powered component when the system load is above the predetermined threshold. A load reduction mechanism is coupled to the at least one powered component and operable to perform at least one load reduction action when the system load is above the predetermined threshold.

20 Claims, 10 Drawing Sheets

(56) References Cited

U.S. PATENT DOCUMENTS

| | | |
|---|---|---|
| 2010/0023787 A1 | 1/2010 | Ho et al. |
| 2010/0052426 A1 | 3/2010 | Carter et al. |
| 2010/0257529 A1 | 10/2010 | Wilkerson et al. |
| 2011/0298437 A1* | 12/2011 | Weng .................. H02M 3/156 323/282 |
| 2012/0030493 A1* | 2/2012 | Cepulis .................. G06F 1/324 713/324 |
| 2014/0095903 A1 | 4/2014 | Muccini et al. |

* cited by examiner

POWER EXCURSION TOLERANT POWER SYSTEM

CROSS-REFERENCE TO RELATED APPLICATIONS

This is a Continuation application to U.S. Utility application Ser. No. 13/630,927 filed Sep. 28, 2012, entitled "POWER EXCURSION TOLERANT POWER SYSTEM," the disclosure of which is incorporated herein by reference in its entirety.

BACKGROUND

The present disclosure relates generally to information handling systems, and more particularly to an information handling system with a power excursion tolerant power system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A number of factors exists and/or are developing in IHSs that raise issues with regard to the demand for power (e.g., associated with throughput of data processing) and the supply of power. For example, processor power usage has continually been trending upwards, and the use of graphics processors and similar devices as co-processors increases throughput of data processing, but with the associated need for a higher supply of power. In another example, processor "turbo mode" operation has been implemented in processors to increase performance by increasing the internal clock frequency for relatively short periods of time, and can cause processors to consume, for example, twice their rated direct current (DC) power consumption, which can place an appreciable load on the power system. In yet another example, shared-infrastructure platforms (e.g., blade and/or other modular platforms) place an emphasis on density and cost, which may be achieved by sizing the power subsystems to meet the typical needs of the system, rather than the worst-case scenarios, which can raise a number of issues.

For example, conventional power systems include an output overload protection scheme that monitors and compares the output of the power supply to a fixed reference overload condition. If the output of the power supply exceeded the fixed reference overload condition, such as when a worst-case power scenario occurs, the power supply disables its output to protect the IHS and the power supply, resulting in shutdown of the power supply and IHS, and is accompanied by the associated possibility of IHS data loss.

In order to avoid shutdown and possible data loss, conventional IHS power systems are selected to meet all power loading conditions of the IHS. Thus, short duration, peak power loading conditions like those discussed above require the power system to be oversized for the majority of system loads in order to prevent power supply shut down in peak power situations, resulting in the power system being costlier and less efficient that a power system that is sized for the majority of situations the IHS will encounter.

Accordingly, it would be desirable to provide an improved IHS power system.

SUMMARY

According to one embodiment, a power system includes at least one powered component; a system capacitance coupled to the at least one powered component; at least one power supply coupled to the at least one powered component, wherein the at least one power supply is operable as a voltage controlled current source to supply power to the at least one powered component when a system load is below a predetermined threshold, and wherein the at least one power supply is operable as a constant current source, and together with the system capacitance, to supply power to the at least one powered component when the system load is above the predetermined threshold; and a load reduction mechanism coupled to the at least one powered component and operable to perform at least one load reduction action when the system load is above the predetermined threshold.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
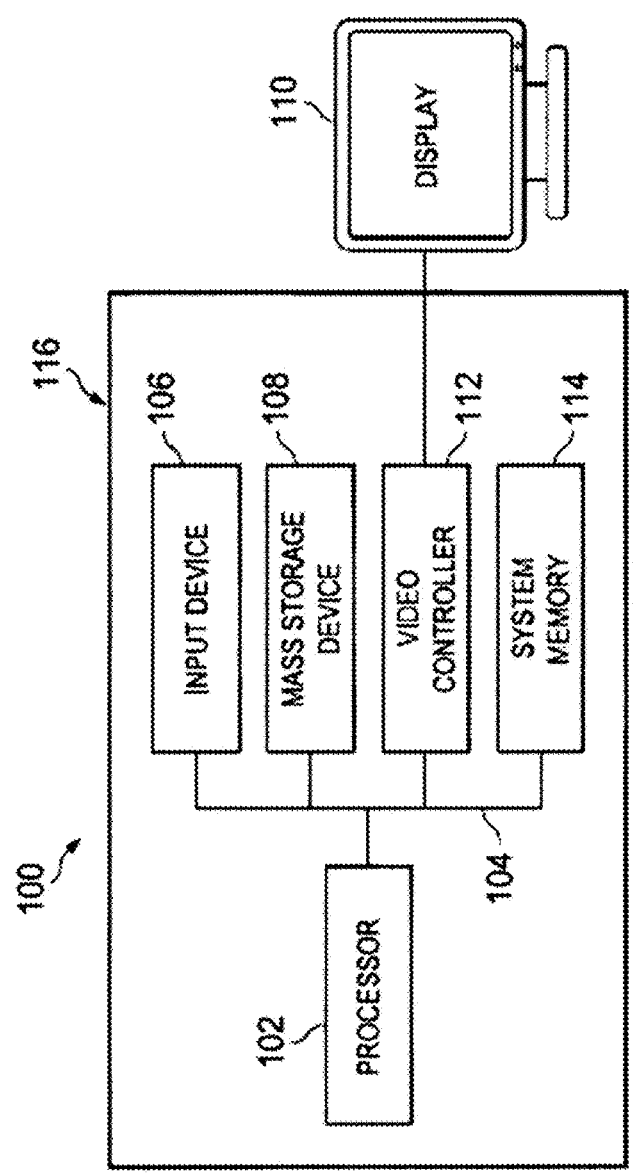
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
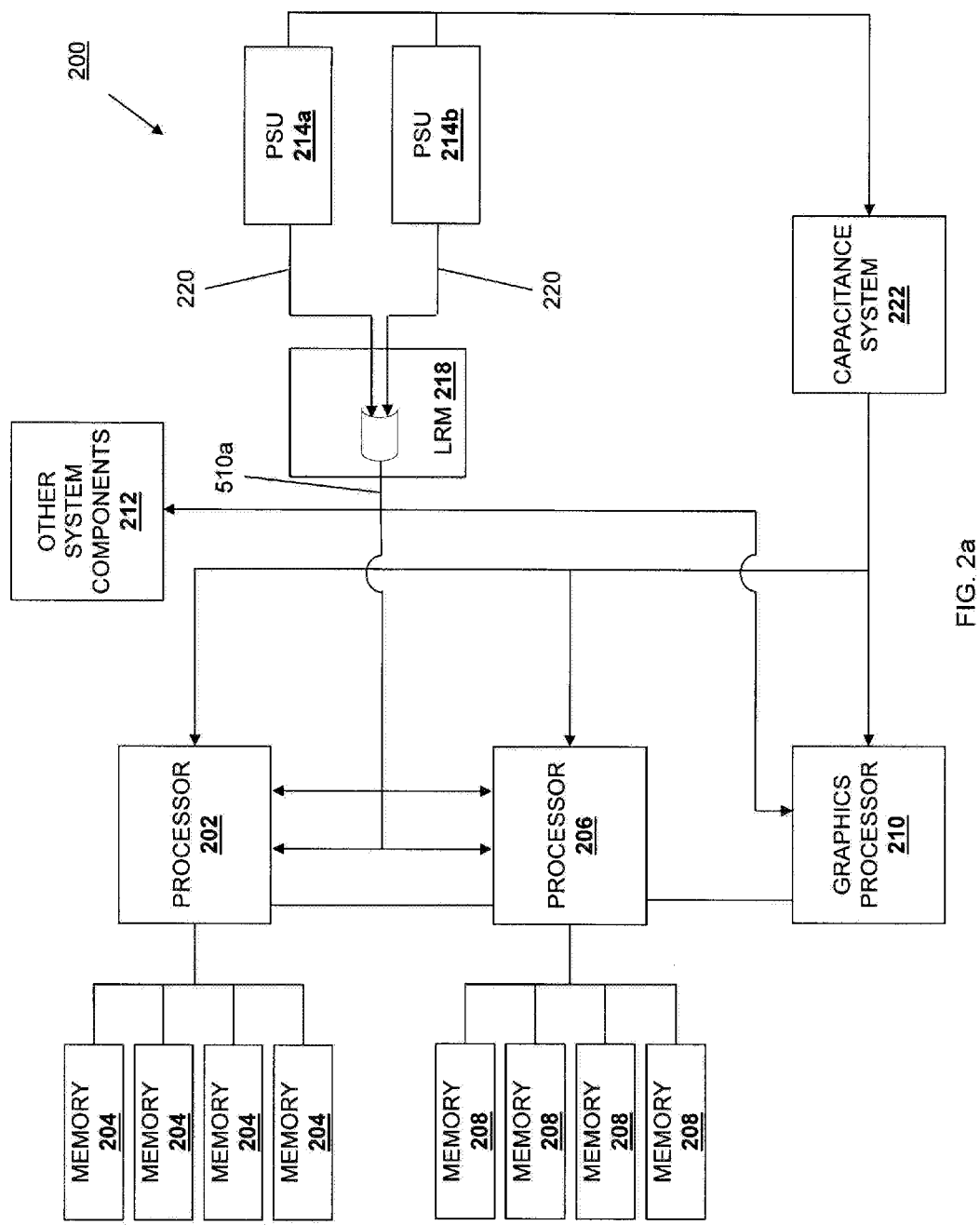
FIG. 2a is a schematic view illustrating an embodiment of a power excursion tolerant power system.
Figure 2B:
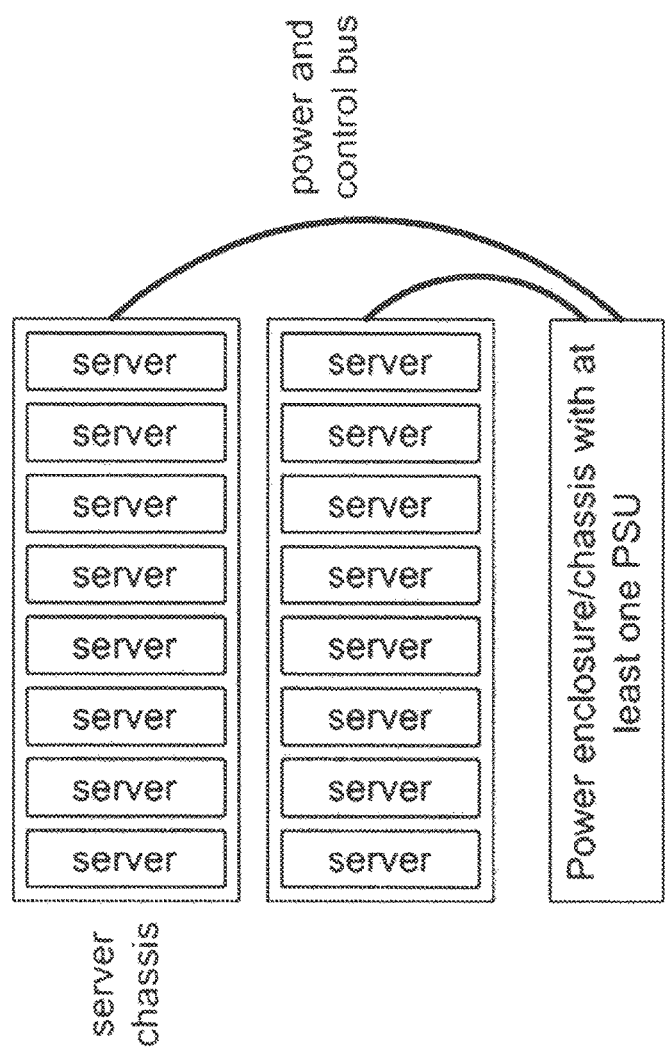
FIG. 2b is a schematic view illustrating an embodiment of the power excursion tolerant power system implemented with multiple server IHSs housed in server chassis and coupled to a power enclosure/chassis though a power and control bus.

Referring now to FIG. 2a, an embodiment of a power excursion tolerant power system 200 is illustrated. As discussed in further detail below, the power excursion tolerant power system 200 may be implemented in or with a variety of IHSs known in the art. For example, the power excursion tolerant power system 200 may be implemented as part of the IHS 100, discussed above with reference to FIG. 1, which may include a server IHS, a desktop IHS, a laptop IHS, a tablet IHS, a mobile phone IHS, and/or a variety of other similar IHSs known in the art. In another example, the power excursion tolerant power system 200 may be implemented as a modular IHS such as, for example, a blade server. In yet another example, illustrated in FIG. 2b, the power excursion tolerant power system 200 may be implemented with a plurality of server IHSs housed in multiple server chassis and coupled to at least one power enclosure/chassis through a power and control bus. As such, in some embodiments, all of the elements in the power excursion tolerant power system 200 may be housed in an IHS chassis (e.g., the chassis 116 discussed above with reference to FIG. 1), while in other embodiments, elements of the power excursion tolerant power system may be coupled to the IHS (e.g., a plurality of modular IHSs may be coupled to a power system that, in the illustrated embodiment, includes the PSUs, discussed in further detail below.) Thus, a wide variety of modification to the specific embodiments discussed below is envisioned as falling within the scope of the present disclosure, including but not limited to distribution of the components across one or more IHSs.

The power excursion tolerant power system 200 includes a plurality of powered components that, in the illustrated embodiment, include a processor 202, a plurality of memory devices 204 coupled to the processor 202, a processor 206, a plurality of memory devices 208 coupled to the processor 206, a graphics processor 210, and a plurality of other system components 212. The other system components 212 may include the components of the IHS 100, discussed above with reference to FIG. 1, fans, and/or a variety of other IHS components known in the art. Each of the processor 202, the processor 206, and the graphics processor 210 may be coupled to each other and/or some or all of the other system components 212. A power supply which, in the illustrated embodiment, includes a plurality of power supply units 214a and 214b, is operable to supply power to each of the processor 202, the processor 204, the graphics processor 210, the memory devices 204, the memory devices 208 and the other system components 212 (while the connections from the PSUs 214a and 214b for providing power are not explicitly called out FIG. 2a, one of skill in the art will recognize that a variety of power connections will fall within the scope of the present disclosure.) The power supply is coupled to a load reduction mechanism 218 and operable to provide a load reduction signal to the load reduction mechanism 218. In the illustrated embodiment, each of the PSU 214 and the PSU 214b are operable to provide the load reduction signal 220 to an OR gate 218a in the load reduction mechanism 218 that is coupled to each of the processor 202, the processor 204, the graphics processor 210, the memory devices 204, the memory devices 208 and the other system components 212. A system capacitance 222 is coupled to the power supply (e.g., the PSUs 214a and 214b in the illustrated embodiment) along with each of the processor 202, the processor 204, the graphics processor 210, the memory devices 204, the memory devices 208 and the other system components 212. In an embodiment, the system capacitance 222 may include a variety of energy storing devices located in the system. For example, the system capacitance 222 may include capacitors, super capacitors, and/or other energy storing devices located on a motherboard in an IHS (e.g., the IHS 100 discussed above with reference to FIG. 1). The system capacitance 222 may be sized based on a predetermined system power excursion amount such that the system capacitance 222 is operable to supply a supplemental amount of power at least equal to the maximum amount of additional power needed by the system when the power system operates as a constant current source, discussed in further detail below.

Figure 3:
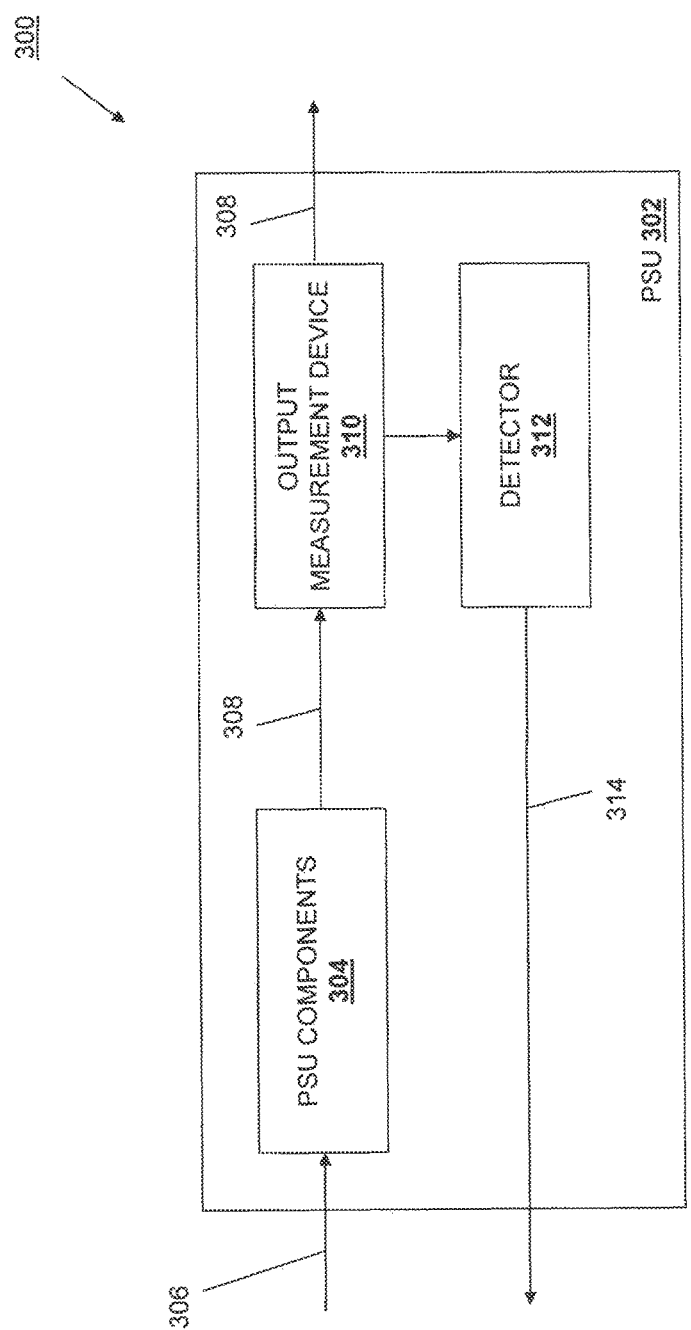
FIG. 3 is a schematic view illustrating an embodiment of a power system component in the power excursion tolerant power system of FIG. 2.

Referring now to FIG. 3, an embodiment of a power system component 300 is illustrated. In the illustrated embodiment, the power system component 300 is a PSU 302 that may be one of the PSUs 214 and/or 214b, discussed above with reference to FIG. 2. However, a variety of other power systems components may include the elements of the PSU 302 discussed below while remaining within the scope of the present disclosure. The PSU 302 includes PSU components 304 that are operable to receive an input power 306 (e.g., Alternating Current (AC) power) and provide an output power 308 (e.g., approximately 12 volt Direct Current (DC) power) that is different from the input power 306. In an embodiment, the PSU components 304 include components that couple to a system (e.g., the IHS 100 discussed above with reference to FIG. 1) and cause the PSU components to adjust the output power 308 based on a required system load. An output measurement device 310 receives the output power 308 and is operable to measure values of the output power 308 while allowing the output power 308 to be supplied from the PSU 302 to powered components in the power excursion tolerant power system 200 discussed with reference to FIG. 2.

For example, the output measurement device 310 may include a sensory device that is operable to measure an output current of the PSU 302 such as, for example, series resistors, current sense transformers, a direct current resistant (DCR) inductor, and/or a variety of other current sense elements known in the art. The output measurement device 310 produces a signal that is indicative of the output power 308/system load and provides that signal to a detector 312 that is operable to determine whether the output power 308/system load is exceeding a predetermined threshold. For example, the detector 312 may include a programmable predetermined threshold output power 308/system load and, when the detector 312 detects that the signal from the output measurement device 310 is indicative of an output power 308/system load that is above the predetermined threshold, the detector 312 may produce a signal or signals 314 that may cause the PSU to enter into a constant current mode operation, discussed in further detail below, and/or may be used as the load reduction signal 220 discussed above with reference to FIG. 2. In an embodiment, the detector 312 may receive the measurement of the output current of the PSU 302 provided by the output measurement device 310 and compare that to the predetermined threshold. The detection methodology discussed above may be configured using analog and/or digital techniques depending on the speed of response and the programmability desired. In an embodiment, the system of the present disclosure attempts to maintain voltage regulation during peak power events. When a PSU enters constant current operation, the amount of output voltage decay is largely dependent upon the amount of system capacitance, system load, and the time it takes to detect the peak power event. The longer a peak power event is endured, without detection and load reduction, the more the PSU output voltage will decay. As a result, the measurement accuracy and detection time should be minimized.

Figure 4:
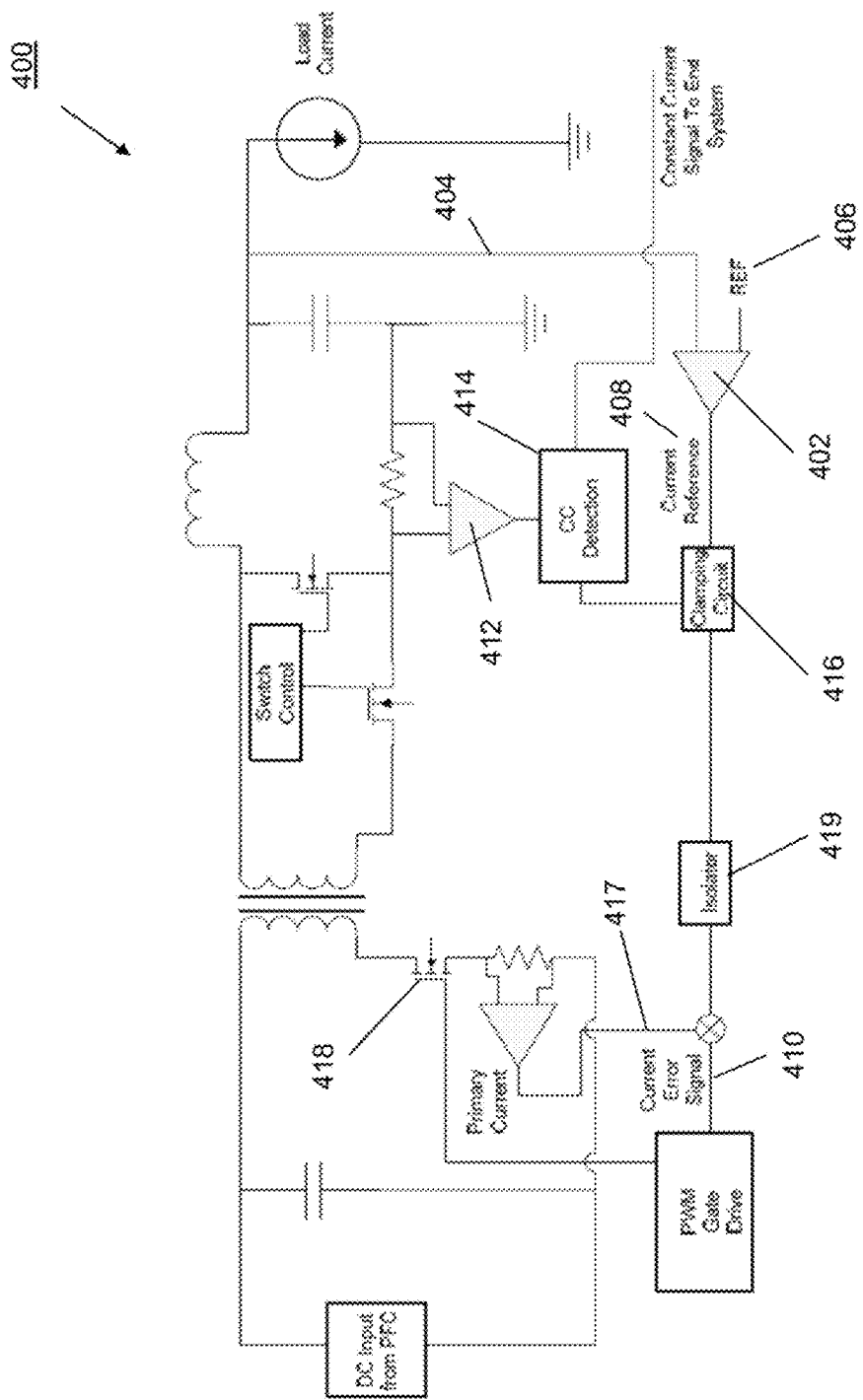
FIG. 4 is a schematic view illustrating an embodiment of a power system component in the power excursion tolerant power system of FIG. 2.

Referring now to FIG. 4, an embodiment of a power system component 400 is illustrated. In the illustrated embodiment, the elements of the power system component 400 may be included in one of the PSUs 214 and/or 214b, discussed above with reference to FIG. 2, or in the PSU 302, discussed above with reference to FIG. 3. The power system component 400 illustrated in FIG. 4 provides an embodiment of a circuit that includes a buck-derived architecture using control circuits that allows the power system to transition from a voltage controlled current source operation to a constant current source operation. However, one of skill in the art will recognize that there are a variety of topologies and control methods that may be used to accomplish the function of the power system component 400, discussed below, and which would fall within the scope of the present disclosure.

The power system component 400 comprises of two main control loops: an output voltage control loop and a current control loop. In normal operation, which is not constant current mode operation, the PSU output voltage control loop compares a voltage 404 against a reference voltage 406 to derive an error voltage that is processed by a compensation network and becomes a current reference 408. A clamping circuit 416 will only impact the current reference 408 when the output current of the PSU exceeds a threshold in a constant current (CC) detection device 414. The current reference 408 is processed over an isolation boundary by isolator 419 and compared against a primary current 417. The error signal that results is a current error signal 410, which is compensated and processed to be used to set the duty cycle for the main switch 418. For conditions when the load current of the PSU exceeds an output current constant current detection level the following chain of events apply. An amplifier 412 measures output current and provides a signal representative of output current to the CC detection device 414. If the output current is greater than the threshold in the CC detection device 414, the CC detection device 414 will signal the clamping circuit 416 and drive the signal to a fixed level. The amplifier 402 will try to increase the voltage of the Current Reference 408, but will be limited to the fixed level set by clamping circuit 416. With the current reference at a fixed level, the PSU will now be forced to control its duty cycle of the primary switch to ensure that the output current remains constant. At this point, the PSU is considered to be in constant current mode. When the output current of the PSU reduces, the amplifier 412 will start to change its output that represents the lower output current, and the CC detection device 414 will signal and release the clamping circuit 416. Once the clamping circuit 416 releases, the PSU will again control its output as a voltage controlled current source.

Figure 5:
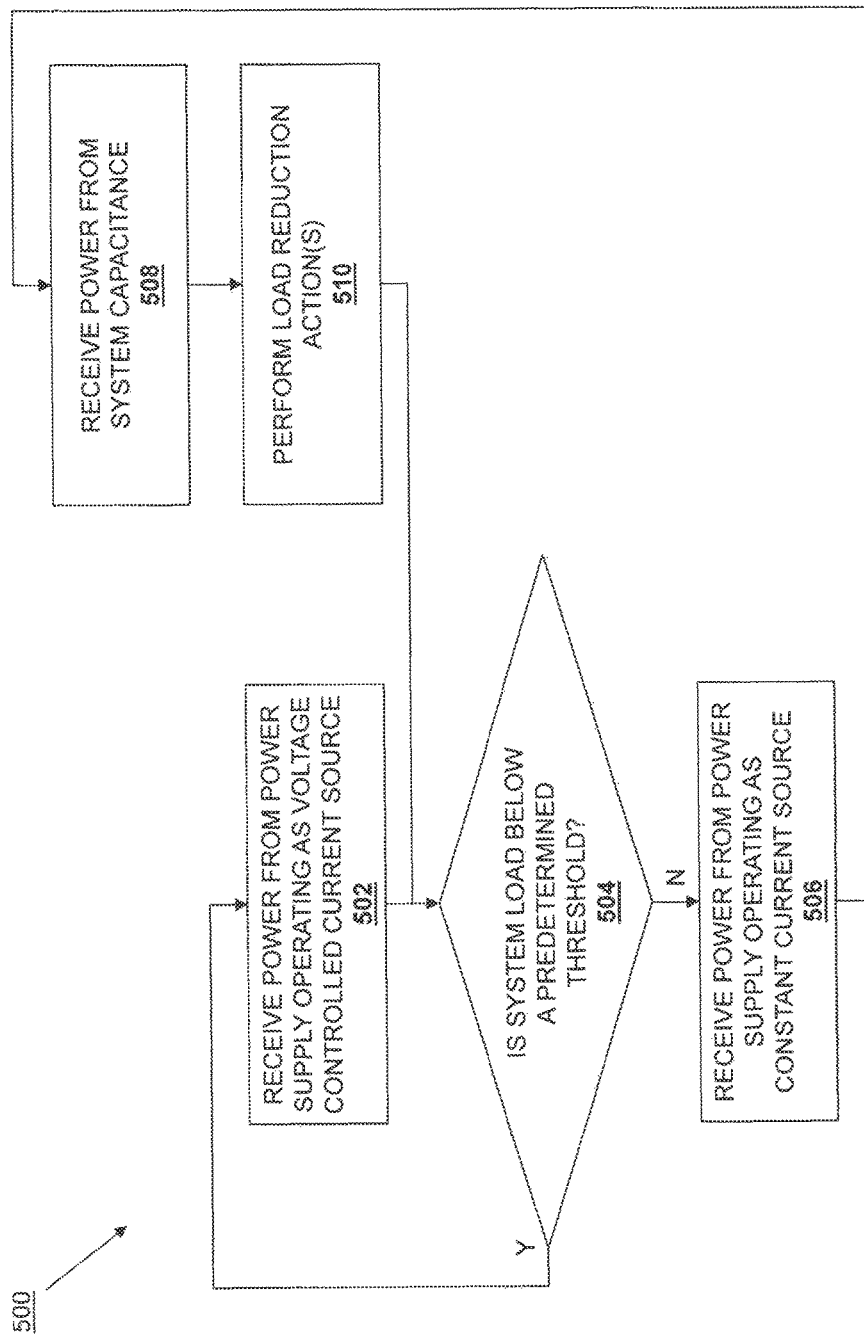
FIG. 5 is a flow chart illustrating an embodiment of a method for tolerating power excursions.
Figure 6:
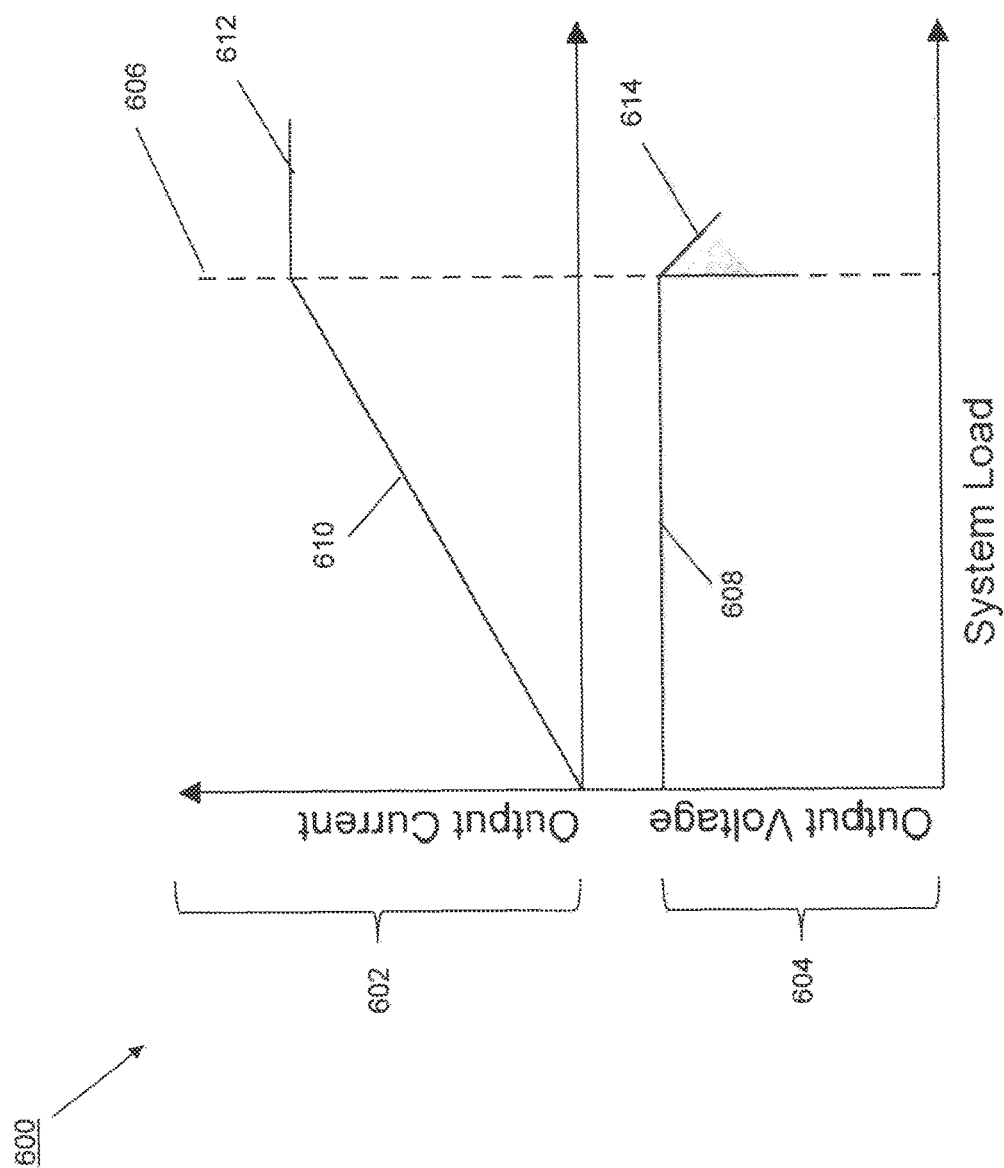
FIG. 6 is a graph illustrating an embodiment of output voltage and output current vs. system load in the power excursion tolerant power system of FIG. 2.

Referring now to FIGS. 5 and 6, a method 500 for tolerating power excursions is provided that begins at blocks 502 and 504 where a powered system with at least one powered component receives power from a power supply operating as a voltage controlled current source as long as the system load is below a predetermined threshold. As can be seen in decision block 504, the power system is operable to determine whether a system load is below a predetermined threshold and, if so, the powered system receives power from a power supply operating as a voltage controlled current source at block 502. As discussed above with reference to FIG. 4, a PSU in the power excursion tolerant power system 200 includes circuits that force the PSU to behave as a voltage controller current source when the system load is less than a predetermined level. FIG. 6 includes a graph 600 that illustrates the operation of such a PSU, with an output current vs. system load section 602 and an output voltage vs. system load section 604. The predetermined threshold 606 is illustrated by a dashed line. As can be seen, at system loads below the predetermined threshold, the output voltage 608 remains substantially constant while the output current 610 increases up to the predetermined threshold. Once the system load current exceeds the predetermined threshold 606, the current is then fixed to a constant level (as illustrated by the constant output current 612 in output current vs. system load section 602.) Voltage decay 614 occurs due to the system load being greater than the predetermined threshold 606, and it is during this time that the constant current detection and load reduction solution works to reduce the system load to a level below the predetermined threshold 606 by forcing PSU behavior as discussed above.

Thus, in one example, the IHS including the processor 202, the memory devices 204, the processor 206, the memory devices 208, the graphics processor 210, and the other system components 212 in the power excursion tolerant power system 200 receives power from the PSU 214a and/or the PSU 214b operating as a voltage controlled current source at block 502, and the power system continually monitors the system load and causes the PSU 214a and/or the PSU 214b to operate as voltage controlled current sources as long as the system load remains below the predetermined threshold.

However, if at decision block 504 the system determines that the system load is not below the predetermined threshold, the method proceeds to block 506 where the powered system receives power from the power supply operating as a constant current source. As discussed above with reference to FIG. 4, a PSU in the power excursion tolerant power system 200 includes circuits that fix the output current of the PSU for as long as the system load would cause the output current of the PSU to be above a predetermined threshold. The graph 600 in FIG. 6 illustrates this behavior as well. As can be seen, when the system loads passes the predetermined threshold 606, the output current 612 becomes substantially constant, allowing the output voltage 614 to decay. The rate of the decay of the output voltage 614 will depend on the system capacitance and the amount of the system load that is above the predetermined threshold 606.

Thus, in one example, the IHS including the processor 202, the memory devices 204, the processor 206, the memory devices 208, the graphics processor 210, and the other system components 212 in the power excursion tolerant power system 200 receives power from the PSU 214a and/or the PSU 214b operating as a constant current source at block 506 as long as the power system determines that the system load is above the predetermined threshold. This behavior avoids PSU overcurrent/overpower shutdown and/or loss of PSU output voltage regulation (when the load reduction signal 220 is drive to the system and the system load is reduced prior to the output capacitance discharge.)

Figure 7A:
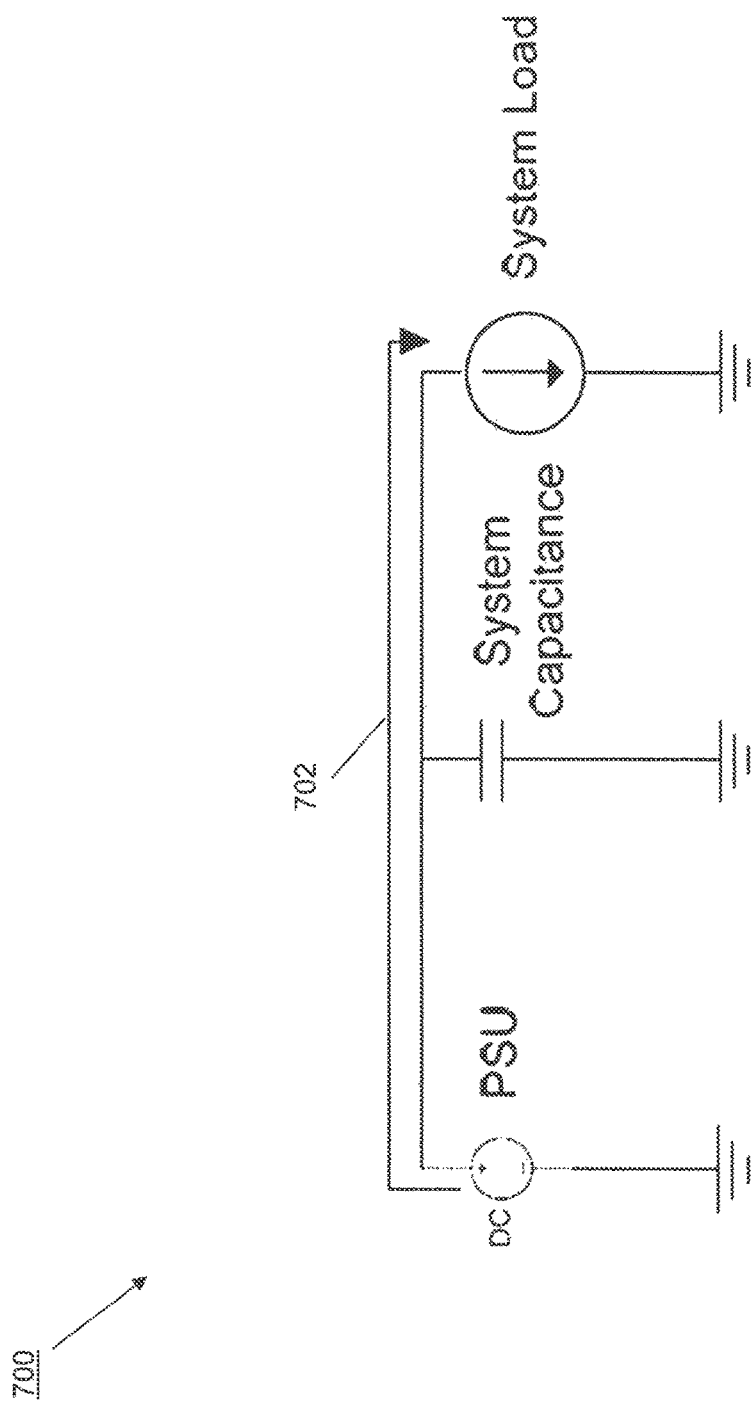
FIG. 7a is a schematic view illustrating an embodiment of the provision of power in the power excursion tolerant power system of FIG. 2 when a system load is below a predetermined threshold.
Figure 7B:
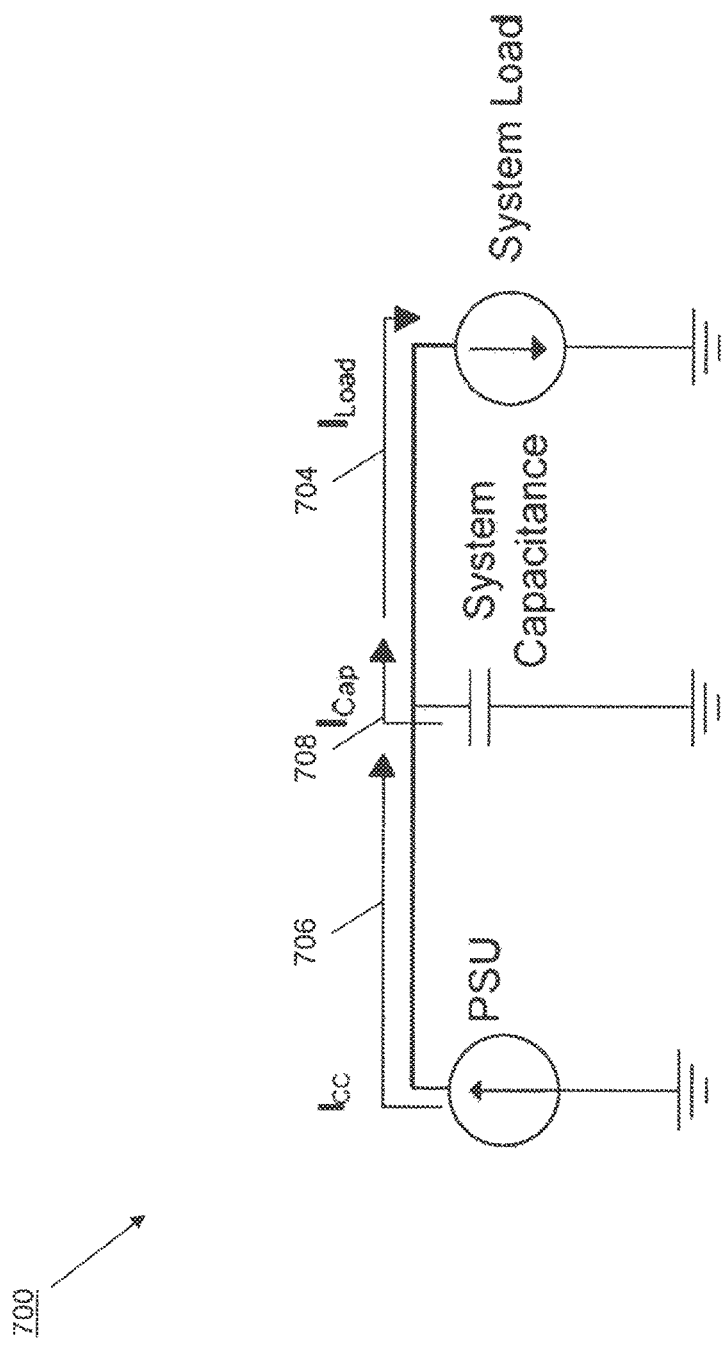
FIG. 7b is a schematic view illustrating an embodiment of the provision of power in the power excursion tolerant power system of FIG. 2 when a system load is above a predetermined threshold.

Referring now to FIGS. 5, 7a, and 7b, the method 500 then proceeds to block 508 where the powered system receives power from the system capacitance. As discussed above with reference to FIG. 2, the system capacitance 222 is coupled to the processor 202, the processor 206, the graphics processor 210, and/or other components in the system. FIG. 7a is a schematic view of the system 700, which may be the power excursion tolerant power system 200 discussed with reference to FIG. 2, illustrating the powering of the system 700 prior to the system load exceeding the predetermined threshold, and FIG. 7b illustrates the powering of the system 700 subsequent to the system load exceeding the predetermined threshold. As can be seen in FIG. 7a, prior to the system load exceeding the predetermined threshold, the system load is powered by a load current 702 provided by the PSU operating as a voltage controlled current source. However, as can be seen in FIG. 7b, subsequent to the system load exceeding the predetermined threshold, the system load is powered by a load current 704 that is provided by a constant PSU current 706 resulting from the PSU operating as a constant current source and a system capacitance current 708 provided by the system capacitance.

The method 500 then proceeds to block 510 where the system performs at least one load reduction action. As discussed above with reference to FIG. 2, each of the PSU 214 and the PSU 214b in the power excursion tolerant power system 300 are operable to provide the load reduction signal 220 to an OR gate 218a in the load reduction mechanism 218 that is coupled to each of the processor 202, the processor 204, the graphics processor 210, the memory devices 204, the memory devices 208, and/or the other system components 212. In response to receiving the load reduction signal 220, the load reduction mechanism 218 is operable to assert a load reduction signal or signals 510a to the processor 202, the processor 204, the graphics processor 210, the memory devices 204, the memory devices 208, and/or the other system components 212 that results in a load reduction action being performed. In an embodiment, load reduction actions may include reducing processor speeds, taking components offline, reducing fan speeds, placing components in sleep states, and/or a variety of other load reduction actions known in the art. In one example, the load reduction signal 510a from the load reduction mechanism 218 is coupled to the PROCHOT# pin on the processor 202 and/or the processor 206, and is operable to provide a command to change the operating state, performance state, and/or otherwise cause the processor 202 and/or the processor 206 to perform an action that reduces the system load on the PSU 214a and/or the PSU 214b (the load reduction signal 510a from the load reduction mechanism 218 may similarly be provided to the graphics processor 210 to provide an equivalent system load reduction signal.) In another example, the load reduction signal 510a from the load reduction mechanism 218 is coupled to the MEMHOT# pin on the memory devices 204 and 208 (or memory device controllers), and is operable to provide a command to cause the memory devices 204 and 208 to perform an action that reduces the system load on the PSU 214a and/or the PSU 214b. Response times to the load reduction signals are on the order of 300 µs, and are expected to decrease as newer generations of processors, memory devices, and/or other system components are introduced (i.e., devices are expected to respond quicker to load reduction signals.)

In an embodiment, assertions of the signal that cause the PSU to operate as a constant current source may be filtered such that the power system does not force PSU operation in constant current mode for very short power excursions, which may allow for the system to ride through brief system load spikes without impacting system performance. Furthermore, in some embodiments, multiple load reduction signals may include a plurality of "stages" or levels to provide different levels of load reduction. For example, upon receiving a load reduction signal 220 from the PSU 214a and/or the PSU 214b, the load reduction mechanism 218 may be operable to assert a first level load reduction signal that causes one or more load reduction actions to be performed. For example, a first level load reduction signal may cause a "clock gating" (a.k.a, a T-state reduction) of the processor 202 and/or 206. Then, if the system load is not sufficiently reduced (e.g., to below the predetermined threshold such that the PSU are no longer operating as constant current source), the load reduction mechanism 218 may be operable to assert a second level load reduction signal that causes one or more load reduction actions to be performed. For example, a second level load reduction signal may cause a frequency reduction (a.k.a., a P-state or $P_{dyn}$ reduction) of the processor 202 and/or 206. These "staged" or leveled load reduction signals may continue until the system load is sufficiently reduced (e.g., to below the predetermined threshold such that the PSU are no longer operating as constant current source). In some embodiments, load reduction signals may only be asserted when the system load is above the predetermined threshold for a predetermined amount of time such that load reduction actions are only performed when the system load is above the predetermined threshold for the predetermined amount of time.

As discussed above with reference to the power system component 400 in FIG. 4, the power excursion tolerant power system 200 is operable to continue to monitor the system load to determine when it reaches a value that would cause the PSU to produce an output current that is below the predetermined threshold and, in response, switch the operation of the power system component 400 such that the power system component 400 operates as a voltage controlled current source.

In an experimental embodiment, the following values were used and the following equations were derived for a power excursion tolerant power system to illustrate the impacts of a system load transient event on voltage regulation:

Nominal PSU Voltage=12.2 volts (V)
Minimum System Voltage=11 volts (V)
System Capacitance=15,000 microfarads (μF)

$$[(I_{peakload} - I_{constantcurrent})(dt)]/(\text{System Capacitance}) = dv$$

dt=Peak Power Excursion Time Duration=1 milliseconds (ms)
$I_{peakload}$=130 amps (A)
$I_{constantcurrent}$=Predetermined Threshold=120 amps (A)

$$dv = [(130\ A - 120\ A)*(1\ ms)]/(15{,}000\ \mu F) = -0.67\ V$$

$$V_{min} = 12.2\ V - 0.67\ V = 11.53\ V$$

One of skill in the art will recognize that this experimental example is one of many embodiments of the present disclosure, and the voltage, capacitance, and current values may vary with the requirements of the system incorporating the teachings of the present disclosure.

Figure 8:
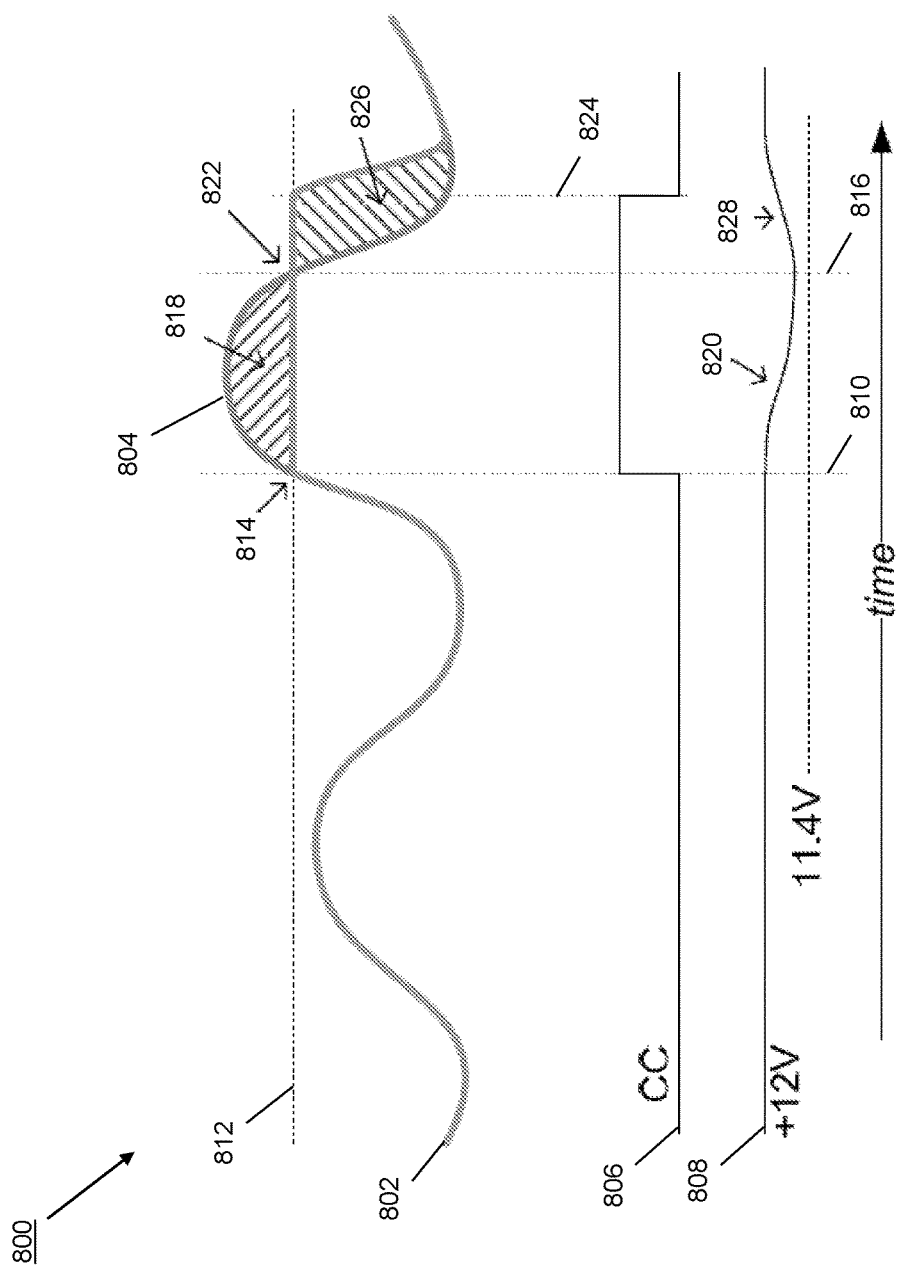
FIG. 8 is a graph illustrating an embodiment of power excursion tolerant power system behavior vs. time.

Referring now to FIG. 8, a graph 800 is provided that plots the PSU output current 802, a system current draw 804, a constant current assertion signal 806, and the PSU output voltage 808 vs. time. Prior to a time 810, the system current draw 804 and the PSU output current 802 are equal and fluctuate below a predetermined threshold 812, the constant current assertion signal 806 remains low, and the PSU operates as a voltage controlled current source with a constant PSU output voltage 808 of approximately 12 volts. At time 810 (point 814), the system current draw 804 exceeds the predetermined threshold 812 (e.g., the current limit of the PSU), the constant current assertion signal 806 goes high, and the PSU begins to operate as a constant current source. Between time 810 and a time 816, area 818 illustrates a deficit of current between the constant current being provided by the PSU output current 802 and the system current draw 804. That deficit of current is supplied by the system capacitance, while the constant current operation of the PSU causes the PSU output voltage 808 to begin to fall at point 820. At time 816 (point 822), the system current draw 804 has decreased to the predetermined threshold 812 (either naturally or in response to load reduction actions, discussed above) and is equal to the PSU output current 802, which ceases the falling of the PSU output voltage 808. Subsequent to point 822 and until time 824, the PSU continues to operate as a constant current source as it works to supply a surplus of current (illustrated by area 826) that may be used to recharge the system capacitance, and the PSU output voltage 808 begins to rise at point 828 until it again reaches approximately 12 volts. As can be seen, the system current draw 804 and the PSU output current 802 become equal once the surplus of current (illustrated by area 826) recharges the system capacitance.

Thus, in one embodiment, a power excursion tolerant power system and method has been described that allows the use of relatively smaller power supplies, having relatively lower output limits, with IHSs that produce power excursions by changing the operation of the power supply from a voltage controller current source to a constant current source, providing supplemental power from a system capacitance, and performing load reduction actions in response to an IHS load exceeding the output limit of the power supply. Such operation allows the relatively smaller power supply to tolerate power excursions produced in the IHS by continuing to operate rather than shutting down in response to the IHS load exceeding the output limit of the power supply, while also performing actions to reduce the IHS load and supplying supplement power to ensure IHS performance. In particular, power systems according to the teachings of the present disclosure may be sized to supply power closer to the average system load rather than the worst case scenario system load, which reduces cost and improves efficiency.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power system, comprising:
at least one powered component coupling that is configured to couple to at least one powered component; and
at least one power supply that is coupled to the powered component coupling and that is configured to:
operate as a voltage controlled current source to supply power through the at least one powered component coupling when a signal that is indicative of a system load indicates that the system load is below a predetermined threshold;
transition, in direct response to the signal that is indicative of the system load indicating a system load increase above the predetermined threshold, from operation as the voltage controlled current source to operation as a constant current source; and
operate as the constant current source to supply power through the at least one powered component coupling when the signal that is indicative of the system load indicates that the system load is above the predetermined threshold.

2. The power system of claim 1, further comprising:
a power supply output monitoring subsystem that is coupled to the at least one power supply and that is configured to generate the signal that is indicative of the system load.

3. The power system of claim 2, wherein the power supply output monitoring subsystem includes:
an output measurement device that is coupled to the at least one power supply and that is configured to measure a power output of the at least one power supply; and
a signal generator that is configured to determine that the power output measured by the output measurement device is greater than the predetermined threshold and, in response, generate the signal that is indicative of the system load.

4. The power system of claim 1, further comprising:
an energy storing subsystem that is coupled to the at least one powered component coupling and that is configured to supply power through the at least one powered component coupling when the at least one power supply is operating as the constant current source.

5. The power system of claim 4, wherein the energy storing subsystem includes at least one capacitor.

6. The power system of claim 4, wherein the energy storing subsystem is sized based on a predetermined system power excursion amount in order to provide supplemental power through the at least one powered component coupling that is in addition to the primary power provided through the at least one powered component by the at least one power supply operating as the constant current source.

7. An information handling system (IHS), comprising:
at least one powered component;
an energy storing subsystem that is coupled to the at least one powered component; and
at least one power supply that is coupled to the at least one powered component and that is configured to:
operate as a voltage controlled current source to supply power to the at least one powered component when a signal that is indicative of a system load indicates that the system load is below a predetermined threshold;
transition, in direct response to the signal that is indicative of the system load indicating a system load increase above the predetermined threshold, from operation as the voltage controlled current source to operation as a constant current source; and
operate as the constant current source to supply power, together with the energy storing subsystem, to the at least one powered component when the signal that is indicative of the system load indicates that the system load is above the predetermined threshold.

8. The IHS of claim 7, further comprising:
a load reduction mechanism that is coupled to the at least one powered component and that is configured to cause at least one load reduction action to be performed when the signal that is indicative of the system load indicates that the system load is above the predetermined threshold.

9. The IHS of claim 8, wherein load reduction mechanism is configured to cause the at least one powered component to perform a first level load reduction action in response to the signal that is indicative of the system load indicating that the system load is above the predetermined threshold, and subsequently cause the at least one powered component to perform a second level load reduction action in response to the signal that is indicative of the system load continuing to indicate that the system load is above the predetermined threshold.

10. The IHS of claim 8, wherein the powered component includes a processing system and the at least one load reduction action includes reducing a speed of the processing system.

11. The IHS of claim 7, further comprising:
a power supply output monitoring subsystem that is coupled to the at least one power supply and that is configured to generate the signal that is indicative of the system load.

12. The IHS of claim 11, wherein the power supply output monitoring subsystem includes:
an output measurement device that is coupled to the at least one power supply and that is configured to measure a power output of the at least one power supply; and a signal generator that is configured to determine that the power output measured by the output measurement device is greater than the predetermined threshold and, in response, generate the signal that is indicative of the system load.

13. The IHS of claim 7, wherein the energy storing subsystem includes at least one capacitor.

14. The IHS of claim 7, wherein the energy storing subsystem is sized based on a predetermined system power excursion amount in order to provide supplemental power through the at least one powered component coupling that is in addition to the primary power provided through the at least one powered component by the at least one power supply operating as the constant current source.

15. A method for supplying power, comprising:
providing, by at least one power supply operating as a voltage controlled current source in response to a signal that is indicative of a system load indicating that the system load is below a predetermined threshold, power to at least one powered component coupling;
transitioning, by the at least one power supply in response to the signal that is indicative of the system load indicating a system load increase above the predetermined threshold, from operation as the voltage controlled current source to operation as a constant current source; and
providing, by the at least one power supply operating as the constant current source in response to the signal that is indicative of the system load indicating that the system load is above the predetermined threshold, power to the at least one powered component coupling.

16. The method of claim 15, further comprising:
generating, by a power supply output monitoring subsystem that is coupled to the at least one power supply, the signal that is indicative of the system load.

17. The method of claim 16, wherein the generating the signal that is indicative of the system load includes:
measuring, an output measurement device in the power supply output monitoring subsystem that is coupled to the at least one power supply, a power output of the at least one power supply; and
determining, by a signal generator in the power supply output monitoring subsystem, that the power output measured by the output measurement device is greater than the predetermined threshold and, in response, generating the signal that is indicative of the system load.

18. The method of claim 15, further comprising:
supplying, by an energy storing subsystem that is coupled to the at least one powered component coupling, power through the at least one powered component coupling when the at least one power supply is operating as the constant current source.

19. The method of claim 18, wherein the energy storing subsystem includes at least one capacitor.

20. The method of claim 18, wherein the energy storing subsystem is sized based on a predetermined system power excursion amount in order to provide supplemental power through the at least one powered component coupling that is in addition to the primary power provided through the at least one powered component by the at least one power supply operating as the constant current source.

* * * * *